United States Patent [19]

Robertson et al.

[11] 4,175,979

[45] *Nov. 27, 1979

[54] PROCESS FOR THE MANUFACTURE OF A PIGMENT COMPOSITION IN BEAD FORM

[75] Inventors: George H. Robertson, Paisley; John A. Stirling, Glasgow, both of Scotland

[73] Assignee: Ciba-Geigy Corporation, Ardsley, N.Y.

[*] Notice: The portion of the term of this patent subsequent to Apr. 5, 1994, has been disclaimed.

[21] Appl. No.: 838,592

[22] Filed: Oct. 3, 1977

Related U.S. Application Data

[63] Continuation of Ser. No. 602,339, Aug. 6, 1975, abandoned.

[30] Foreign Application Priority Data

Aug. 21, 1974 [GB]   United Kingdom ............... 36700/74

[51] Int. Cl.$^2$ ............................................. C09C 3/00
[52] U.S. Cl. .............................. 106/309; 106/308 Q; 106/308 N; 106/308 F; 106/308 M; 260/18 R; 260/23 R; 260/21; 264/117
[58] Field of Search ........... 106/308 Q, 308 N, 308 F, 106/308 M, 309; 260/18 R, 23 R, 21; 264/117

[56] References Cited

U.S. PATENT DOCUMENTS

| | | | |
|---|---|---|---|
| 2,776,267 | 1/1967 | Weber et al. ........................ | 106/309 |
| 3,368,992 | 2/1968 | Altermatt ............................ | 260/29.2 |
| 3,449,291 | 6/1969 | Lerman et al. ..................... | 106/308 Q |
| 3,642,650 | 2/1972 | McIntosh ............................. | 106/309 |
| 3,730,750 | 5/1973 | Fabian .................................. | 106/309 |
| 3,856,699 | 12/1974 | Miyano et al. ..................... | 106/308 F |
| 4,015,999 | 4/1977 | Robertson et al. .................. | 106/309 |

FOREIGN PATENT DOCUMENTS

919495 2/1963 United Kingdom .
1181055 2/1970 United Kingdom .
1237967 7/1971 United Kingdom .

OTHER PUBLICATIONS

"The American College Dictionary", Random House, New York, 1947, p. 953.
"The American Heritage Dictionary of the English Language", Houghton Mifflin Co., Boston, p. 382.

*Primary Examiner*—L. Dewayne Rutledge
*Assistant Examiner*—John P. Sheehan
*Attorney, Agent, or Firm*—Joseph F. DiPrima

[57] ABSTRACT

A process for the production of a pigment composition in bead form which comprises contacting with agitation, in the presence of an aqueous protective colloid, 1 part of a water insoluble carrier melting below 100° C. and an aqueous dispersion containing 0.25–2,3 parts of a pigment or water insoluble dyestuff at a temperature above the melting point of the carrier and allowing the aqueous phase to become substantially free of pigment or water insoluble dyestuff by its association with the carrier and recovering the resulting pigmented beads which are easily dispersible in polymeric compounds to yield even colorations.

14 Claims, No Drawings

PROCESS FOR THE MANUFACTURE OF A PIGMENT COMPOSITION IN BEAD FORM

This is a continuation of application Ser. No. 602,339, filed on Aug. 6, 1975, now abandoned.

The present invention relates to a process for the manufacture of pigment compositions in bead form suitable for colouring inks, paints and plastics.

Pigments are generally produced in powder form and are usually used as such. Powders have several disadvantages, mainly in handling, since a large amount of dust is produced making them unpleasant to use. They are also dirty in manufacturing and difficult to separate from liquor. Also, powders are not always as free-flowing as is desired. A further disadvantage is that in order to colour a substance evenly, the powder must be evenly distributed throughout the substance and, particularly when colouring plastics, this can involve prolonged and expensive mechanical working. It has been proposed to produce pigmented polymers in bead form which can be easily mixed with and used to colour plastics materials. It has also been proposed to produce pigments and other substances in the form of a granulate by precipitating the pigment or other substance from an aqueous suspension in the presence of an organic compound as granulating agent. It is an object of the present invention to provide a pigment composition in a free-flowing, non-dusting, non-aggregating, non-sticky generally spherical form based on organic materials which are compatible with high weight organic materials such as inks, paints and plastics, and can be readily incorporated into same.

According to the present invention there is provided a process for the production of a pigment composition which comprises contacting with agitation, in the presence of an aqueous protective colloid, a water insoluble organic carrier melting below 100° C. and an aqueous dispersion of pigment or water insoluble dyestuff at a temperature above the melting point of the carrier and allowing the aqueous phase to become substantially free of pigment or water insoluble dyestuff by its association with the carrier and recovering the resulting pigmented beads.

The carrier may be a single compound or it can be a mixture of compounds which give a mixed melting point in the preferred range of 40° to 100° C. It is not necessary for the composition to have a sharp melting point, which of course a single compound have, but it may melt over a range of a few degrees, e.g. over 15–20 centigrade degrees.

The choice of carrier will largely be governed by the needs of the system in which the beads are to be used to ensure adequate solubility in and compatibility with the solvent and resin or polymer respectively. Examples of suitable carriers include fatty alcohols, such as cetyl alcohol and stearyl alcohol, fatty esters such as cetyl palmitate, glyceryl tristearate, glyceryl tripalmitate, diethylene glycol distearate and triethylene glycol monostearate, fatty amides such as oleamide and palmitamide, fatty esters of polyols such as hardened castor oil, benzoic acid esters of polyols, phthalate esters such as dicyclohexyl phthalate, fatty oxazolines such as stearyl oxazoline, water insoluble carboxylic acids such as stearic acid, behenic acid, N-dodecyl phthalamic acid, alkylimides such as N-dodecyl phthalimide and N-octyl phthalimide alkyl hydantoins such as 3-stearyl-5',5'-dimethyl hydantoin and 1-hydroxyethyl-3-stearyl-5,5'-dimethyl hydantoin.

In addition to using single compounds, mixtures of compounds may be used such as mixtures of those specified above. However, mixtures of particular value are those based on rosin acid or modified rosin acid such as wood rosin, hydrogenated wood rosin, Staybelite resin (Staybelite is a Trade Mark) and its water insoluble metal salts such as zinc resinate and calcium resinate with the compounds listed above or with fatty primary amines such as n-dodecylamine, stearylamine or fatty secondary amines such as dicocoamine or fatty imidazolines.

The aqueous protective colloid may be used in an amount such as will form a solution of about 0.2 to 5% w/w, but preferably 0.5 to 2% w/w. based on the amount of pigment plus organic composition, and may be, for example, cellulose derivatives such as hydroxy ethyl cellulose, hydroxy propyl cellulose, polyvinyl alcohol, polyethylene oxide, polypropylene oxide, copolymers of ethylene oxide and propylene oxide, adducts of ethylene oxide or propylene oxide, polyvinyl pyrrolidone and its copolymers or mixtures of these compounds. The preferred compounds are those of the hydroxy ethyl cellulose type as exemplified by the Natrosol range of the Hercules Powder Company. When polymers of the ethylene or propylene oxide type are being used it is advantageous to carry out the preparation above the cloud point (see Kirk-Othmer's Encyclopedia of Chemical Technology, Vol. 19, p. 531) of the surfactant, and at the lower levels of concentrations.

The aqueous pigment dispersion may be one obtained directly from an aqueous preparation, for example, an azo coupling. In this case the dispersion may contain additives of general application is pigment technology, but these additives must allow or aid the bead formation and not affect the melting point or tackiness of the beads to such an extent that the final composition has undesired characteristics.

The pigment dispersion may also be a redispersed aqueous pigment presscake or a redispersed pigment powder. The aqueous presscake or powder may be redispersed into water by stirring or by high energy dispersion.

The particle size of the molten carrier and of the resulting pigmented beads may be up to 5 mm. diameter, preferably from 0.5 to 2 mm. diameter. When the pigment or dyestuff dispersion is contacted with the carrier at a temperature at which the latter is a liquid the agitation is continued preferably until the aqeous phase is substantially free from pigment. The ratio of pigment to carrier varies from 0.25:1 to 2.3:1, preferably from 1:1 to 1.5:1. If smaller amounts of carrier are used the resulting product has inferior dispersibility properties making it very difficult to incorporate into the desired system.

The pigment dispersion may be contacted with the carrier in the presence of a protective colloid before, during or after heating. In one method, the protective colloid, powdered carrier and pigment are mixed at ambient temperature, and the mixture is then agitated at a temperature above the melting point of the carrier. In a second method, a mixture of the protective colloid and carrier is agitated above the melting point of the carrier, and the pigment dispersion is added to the hot dispersion with agitation. In a third and preferred method an aqueous mixture of the protective colloid and pigment is heated to a temperature above the melting point of the carrier and the carrier as a powder is added to this mixture with agitation.

In order to assist bead formation an aid in amounts of up to 10% w/w on pigment may be added to the mixture, but preferably in amounts of up to 5%. By "aid" is meant a compound or composition which when added to, or prepared in the presence of the aqueous pigment dispersion (with or without the organic bead forming composition or protective colloid being present at this stage) facilitates the subsequent association of the pigment with the organic phase. The aid is a compound or composition which is initially water soluble and may be rendered water insoluble/oil soluble by subsequent reaction. The aid may be, for example, a fatty amine or a fatty acid rendered water insoluble either by pH control or salt formation, e.g. by adjusting an amine-acetate solution to pH10.

The aid is conveniently prepared in the presence of an aqueous pigment dispersion. For example, an aqueous pigment presscake (20% w/w pigment) is redispersed in an aqueous solution of a $C_{18}$ alkyl amine acetate to produce a 5% w/w aqueous pigment dispersion. To this dispersion is added a solution of sodium oleate (or other soluble alkali metal salt of oleic acid) in sufficient amount to form the oleate of the alkyl amine. The monoamine may be replaced by a related diamine and the corresponding di-oleate formed. The oleic acid may be replaced by other carboxylic or sulphonic acid which produce water insoluble salts with the selected amine.

As an alternative, the sodium oleate (or other salt) may be initially present in the pigment dispersion, and the alkyl amine added to produce an insoluble salt.

It is also possible to produce an aid by changing the pH of the dispersion. For example, sodium oleate may be converted to the substantially water insoluble oleic acid by additions of acetic acid to a pH of 4–5. Alternatively, if a $C_{18}$ alkyl amine acetate, for example, is present, this may be rendered insoluble by the addition of an alkali to a pH of 10–11.

When highly polar pigments such as metal salts, metal complexes or the pigments described and claimed in German OL No. 2 401 597 are used, amines at pH 4–5 are very effective, i.e. pH adjustment to 9–10 is not necessary.

It should also be noted that some of the above-mentioned compounds may be present during the pigment preparation, for example, Armeen T (a $C_{18}$ alkyl amine from Armour Hess) may be present during an azo coupling. Equally; to those skilled in the art, it will be obvious that water soluble forms of these aids may be used to redisperse pigment presscake or powder.

The pigmented beads may be recovered by any desired method. They may, for example, be filtered off and washed. This may be done on a screen to give quick removal of the water. Filtration of conventional pigment slurries is slow and results in a presscake having about 80–90% of water. The beads which contain only 50% of water may then be dried, either in a conventional oven or in an air stream. In some instances it may be necessary to cool the pigmented beads to avoid aggregation or coalescence during filtration.

Provided that the carrier used is compatible with the desired system to be coloured, the beads are readily incorporated therein to give an evenly coloured product.

The process of the present invention produces a good yield of well formed free flowing beads which can be readily dispersed into application media. By contrast, poor yields of irregularly shaped granules having a wide size distribution and poor dispersibility are obtained when lower proportions of carrier are used, i.e. pigment to carrier ratios in excess of 2.3:1. By low yield we mean that on isolating the material from the aqueous slurry by filtration and washing on a 100 mesh sieve a large proportion of pigment particles is contained in the filtration rather than in the product on the screen.

The invention will be illustrated by reference to the following Examples, in which parts by weight bear the same relation to parts by volume as do kilograms to liters.

EXAMPLE 1

0.75 Parts by weight hydroxyethyl cellulose (Natrosol 250 HR) were wetted with 2 parts by volume methanol and added to 200 parts by volume of water at 80° C. with stirring until a solution was obtained. 30 Parts by weight dicyclohexyl phthalate were then added and the mixture was stirred to form a dispersion of the dicyclohexyl phthalate. 30 Parts of C.1 Pigment Yellow 13 in 500 parts of water, obtained by a conventional acetate buffered aqueous coupling was heated to 85° C. and added to the aqueous dispersion of dicyclohexylphthalate. This mixture stirred at 80°–85° C. for 45 minutes to give yellow beads of 0.5–2 mm. diameter which could be removed on a sieve of BS.100 mesh (0.152 mm. aperture) gave a virtually pigment free aqueous filtrate. This product when washed salt free and dried at 40° C. could be readily incorporated on a 2 roll mill in to plasticised P.V.C. When the dicyclohexyl phthalate in the above process was reduced to 6 parts only 18 parts of a composition containing 64% pigment was retained by the above sieve. The filtrate contained the remainder which analysed as practically pure pigment.

EXAMPLE 2

0.75 parts of hydroxyethyl cellulose wetted out with methanol was added to 30 parts of Cl Pigment Yellow 13 slurry as obtained in Example 1. 30 parts dicyclohexyl phthalate powder was then added to this aqueous slurry and the mixture heated to 85° C. After 40 minutes at 85° C. a product similar to that obtained in Example 1 was obtained. Again if the dicyclohexyl was reduced to 6 parts only 20 parts of a compositon containing 70% pigment was retained by the sieve. The unretained solid material was again practically pure pigment.

EXAMPLE 3

A slurry containing 30 parts Cl Pigment Yellow 13 and 0.75 parts hydroxyethyl cellulose prepared as in Example 2 was heated to 85° C. 30 parts of powdered dicyclohexyl phthalate was then added to the stirred slurry. After 45 minutes yellow beads similar to those obtained in Example 1 were removed. The filtrated was again free of pigment. The resultant washed and dried beads had similar properties to those of Example I. If the dicyclohexyl phthalate was reduced to 6 parts and added either as a melt or powder, 14.5 parts of a composition containing 58% pigment were recovered on the sieve and the remaining pigment went through with the filtrate.

EXAMPLE 4

The procedure of Example 3 was repeated except that before addition of the dicyclohexyl phthalate powder the pigment slurry and hydroxyethyl cellulose was adjusted to pH10. 0.5 parts of sodium oleate was added and the pH adjusted to 5. The beads which were similar to those obtained in Example 3 were completely formed in 20 minutes. The application properties were also similar to those of Example 3.

When the above procedure was repeated except that the hydroxyethyl cellulose was not added and the mixture stirred for 4 hours at 85° C. 50 parts of irregularly shaped granules were retained on the sieve. Also, if the pH was not adjusted to 5, but left at 10, there was very little bead formation.

EXAMPLE 5

0.75 Parts by weight hydroxyethyl cellulose (Natrosol 250 HR) were wetted with 2 parts by volume methanol and added to 200 parts by volume of water at 80° C. with stirring until it was all dissolved. 30 parts by weight dicyclohexyl phthalate were then added and the mixture was stirred to form a dispersion of the dicyclohexyl phthalate. Pigment presscake (equivalent to 50 parts by weight, dry weight) of C.I. Pigment Yellow 13, was slurried in 200 parts by volume water with 0.5 parts by weight Armeen T which had been predissolved in 5 parts by volume glacial acetic acid, and heated to 86° C. The slurry was added to the stirring dicyclohexyl phthalate over 10 minutes and stirred at 80° C. for 45 minutes to give a virtually pigment free aqueous phase.

The product was separated on a BS 60 mesh sieve and washed thoroughly with cold water. The residue was dried in a cool oven. The yield was 78 parts by weight of yellow beads. Dispersion on a 2 roll mill by conventional means in polyvinyl chloride gave an evenly coloured product.

EXAMPLE 6

An aqueous solution of hydroxyethyl cellulose was prepared as in Example 1, but at room temperature. To this solution was added 30 parts by weight dicyclohexyl phthalate and 50 parts by weight of C.I. Pigment Yellow 13, slurried as in Example 1, also at room temperature. The mixture was heated to 80° C. with stirring, and stirring was continued until all of the pigment had associated with the organic phase. The yellow beads were recovered by the procedure set forth in Example 1.

EXAMPLES 7–20

The procedure set forth in Example 5 was repeated using the substances in the Table below. In all cases the pigment/organic composition (carrier) ratio is 1/1. Where an aid is indicated, it was added to was heated pigment slurry before it was added to the stirring dispersion. The amount of aid was 10% w/w based on the dry weight of pigment.

TABLE

| Ex. No. | Pigment | Pigment weight (parts) | Carrier** | Contact Time | Temp. | Aid | Yield (parts) |
| --- | --- | --- | --- | --- | --- | --- | --- |
| 7 | C.I. Pigment Yellow 12 | 30 | Dicyclohexyl Phthalate | 30 mins. | 80° C. | oleic acid* | 60 |
| 8 | C.I. Pigment Blue 15.3 | 30 | Dicyclohexyl Phthalate | 2 hours | 80° C. | oleic acid* | 57 |
| 9 | C.I. Pigment Red 166 | 30 | Dicyclohexyl Phthalate | 2½ hours | 80° C. | — | 51.5 |
| 10 | C.I. Pigment Yellow 74 | 30 | Dicyclohexyl Phthalate | 30 mins. | 80° C. | — | 60 |
| 11 | C.I. Pigment Yellow 13 | 15 | phthalimide-N-C$_{12}$H$_{25}$ | 1 hour | 80° C. | — | 28.5 |
| 12 | C.I. Pigment Yellow 13 | 15 | phthalimide-N-C$_8$H$_{17}$ | 1½ hours | 80° C. | — | 27 |
| 13 | C.I. Pigment Yellow 12 | 30 | benzene-COOH / CONH C$_{12}$H$_{25}$ | 2 hours | 70–75° C. | — | 54 |
| 14 | C.I. Pigment Yellow 13 | 30 | Hardened Castor Oil | 40 mins. | 90° C. | — | 60 |
| 15 | " | 30 | Hardened Castor Oil Dicyclohexyl phthalate | 40 mins. | 90° C. | — | 60 |
| 16 | " | 30 | Oleamide (Armid O) | 40 mins. | 80° C. | — | 60 |
| 17 | " | 30 | Stearamide/Dicyclohexyl Phthalate | 60 mins. | 85° C. | — | 58 |
| 18 | " | 30 | Dicyclohexyl phthalate/ N-octyl phthalimide (27/3) | 60 mins. | 85° C. | — | 60 |
| 19 | C.I. Pigment Yellow 23 | 30 | Hardened Castor Oil | 50 mins. | 90° C. | — | 60 |
| 20 | C.I. Pigment Yellow 12 | 30 | Oleamide (Armid O) | 30 mins. | 80° C. | — | 60 |

*Formed by the acidification of pigment slurry + sodium oleate.
**All at equal parts by weight to pigment. Where mixtures used all at a 1/1 ratio by weight unless otherwise stated.

EXAMPLES 21–23

Example 1 was repeated except that the hydroxyethyl cellulose Natrosol 250 HR used in Example 1 was replaced by an equal amount of
21. Natrosol 250 G.R.

22. Natrosol 250 M.R.
23. Polyvinyl alcohol Elvanol 50.42
Results similar to those in Example 1 were obtained.

EXAMPLE 24

500 parts by volume of a slurry obtained directly from an aqueous coupling containing 30 parts by weight C.I. Pigment Yellow 12 was heated at 95° C. for 1 hour and added to a mixture of 0.25 parts by weight hydroxy ethyl cellulose, 30 parts by weight N-octyl phthalimide, 3.0 parts by weight Imidrol SC (2 heptadecyl, 3 aminoethyl imidazoline) and 300 parts by volume water, and the mixture was stirred at 75°-80° C. 1.5 parts by weight of oleic acid as its sodium salt was then added and the mixture stirred for 5 minutes. Dilute acetic acid was then added to lower the pH from 10 to 6. The resultant yellow beads were separated off through a screen, washed with cold water and dried in a cool (30° C.) oven.

The yield was 54.3 parts by weight.

The beads were incorporated by conventional means into publication gravure medium to give an evenly coloured product.

EXAMPLE 25

The procedure of Example 17 was repeated using 25 parts of C.I. Pigment Yellow 13 and 4 parts of sodium oleate and 15 parts of Armeen 20—a trade mark of Armour Hess.

The resultant 37.6 parts of yellow beads gave an evenly coloured product when incorporated into PVC medium.

EXAMPLE 26

260 parts by volume of slurry obtained directly from an aqueous coupling containing 15 parts by weight of C.I. Pigment Yellow 12 was heated to 80°-85° C. and added over 5 minutes to a mixture of composition formed by melting together 9.0 g. of wood rosin and 6.0 g. $C_{16}$-$C_{18}$ fatty acid amide (Armid HT—a trade mark), 0.6 parts by weight of hydroxy ethyl cellulose (Natrosol 250 HR—a trade mark of the Hercules Powder Co.) and 150 parts by volume of water at 85° C. The mixture was stirred at 80°-85° C. for 4 hours when the aqueous liquors were substantially free of pigment. The product was separated using a screen washed with cold water and dried in a cool oven yielding 28.2 parts by weight of yellow beads.

The beads when incorporated into publication gravure medium gave an evenly coloured product.

EXAMPLE 27

The procedure set forth in Example 17 was repeated using a composition formed by melting together a 1:1 mixture of zinc calcium resinate and oleamide in place of the wood rosin—Armid HT mixture. The yield was 59.8 parts of yellow beads which gave satisfactory results in publication gravure medium.

EXAMPLE 28

20 parts of C.I. Pigment Yellow 12 modified according to Example 1 of German OL No. 2 401 597 was prepared in 400 parts of water in the presence of 0.5 parts hydroxyethyl cellulose (Natrosol 250 HR). This slurry was heated to 80° C. and 20 parts of Oleamide (Armid O) flake was introduced with stirring. Stirring was continued for 60 minutes at 80° C. until the aqueous phase was substantially free of pigment. The resultant beads, 40 parts, were recovered on a BS100 mesh sieve, washed salt free and dried at 40° C. The product could be readily dispersed into a toluene/aliphatic hydrocarbon (equal parts) solution of a phenolic modified rosin/zinc calcium resinate (equal parts) publication gravure media.

EXAMPLE 29

Example 28 was repeated except that the oleamide was replaced by stearyl alcohol. Very fine beads of 0.5 mm. were obtained. When the amount of hydroxyethyl cellulose was reduced to 0.25 parts beads similar in size to those with the oleamide carrier were obtained. When the process was carried out in the absence of hydroxyethyl cellulose irregular beads of up to 5 mm. were obtained. The latter product was more difficult to disperse into a publication gravure media.

EXAMPLE 30

The procedure in Example 28 was repeated using hydrogenated wood resin and oleamide premelted together in the ratio 3:2 respectively and the resultant solid used in place of oleamide. 38.3 parts of yellow beads were obtained which gave a satisfactory product for use in publication gravure medium.

EXAMPLE 31

20 parts of C.I. Pigment Yellow 13, as slurry, obtained directly from coupling was heated to 80° C. with stirring and with 0.5 parts of hydroxyethyl cellulose (Natrosol 250 M) at pH 4.5 was added, followed by 20 parts dicyclohexyl phthalate. Stirring was continued at 80° C. until the aqueous liquors were substantially free of pigment (2 hours). The beads were separated using a screen, washed with cold water and dried in a cool (35° C.) oven. 39.7 parts yellow beads were obtained which gave an evenly coloured product in P.V.C.

EXAMPLE 32

Example 31 was repeated, except that the Natrosol 250 M was replaced by Natrosol 250 GR. The yield was 40.0 parts of yellow beads which gave an evenly coloured product in P.V.C.

EXAMPLE 33

Example 28 was repeated, except that 0.3 parts of a fatty amine (Armeen T) as its acetate was added to the pigment slurry before the addition of the oleamide. Beads were formed immediately and the aqueous phase was substantially clear after 15 minutes as opposed to 60 minutes when no amine acetate addition was made. The beads gave an evenly coloured product in P.V.C. Elimination of the hydroxy ethyl cellulose gave a low yield of irregularly shaped beads.

EXAMPLE 34

20 parts of C.I. Pigment Yellow 129 from a 15% w/w aqueous presscake was dispersed in 400 parts of water at pH5 with 0.5 parts of Natrosol 250 HR. The slurry was heated to 80° C. and 0.5 parts of a fatty amine (Armeen T) as its acetate was added. 20 parts of dicyclohexyl phthalate was then added with stirring. A good yield of regularly shaped beads was obtained, which gave an evenly coloured product in P.V.C.

EXAMPLE 35

Example 34 was repeated, except that the pigment used was 20 parts of CI Pigment Yellow 61. The resulting beads gave an evenly coloured product in PVC.

EXAMPLE 36

The procedure set forth in Example 1 was repeated, using in place of dicyclohexylphthalate, a premelted mixture of oleamide/cholesterol (1:1). The resultant beads gave evenly coloured products in PVC and polyethylene.

EXAMPLE 37

The procedure of Example 2 was repeated, using CI Pigment Red 48 (ca salt) in place of CI Pigment Yellow 13 and cetyl palmitate in place of dicyclohexylphthalate. The resultant beads gave evenly coloured products in PVC and polyethylene.

EXAMPLE 38

Example 37 was repeated, except that the cetyl palmitate was replaced by diethylene glycol monostearate. The resultant beads gave evenly coloured products in PVC and polyethylene.

EXAMPLE 39

The procedure of Example 2 was repeated, using slightly chlorinated alpha Pc blue in place of CI Pigment Yellow 13 and hardened castor oil in place of dicyclohexylphthalate. P.V.C. and polyethylene were evenly coloured by the resultant product.

EXAMPLES 40–45

The procedure set forth in Example 3 was repeated except that a non ionic surfactant was added or replaced hydroxy ethyl cellulose, as shown in the following table. It is seen that in terms of yield it is preferable to carry out the preparation above the cloud point (as described earlier) of the non-ionic surfactant, especially in the presence of hydroxy ethyl cellulose.

| Example | H.C.C. | Non-Ionic | Cloud Point | Prep$^n$ Temp. | % yield | |
|---------|--------|-----------|-------------|---------|---------|---|
| 40 | Nil | 0.5 parts TX102$^{(1)}$ | 88° C. | 70° C. | 88.1 | (1) Triton X102 - a polyethoxylated octyl phenol |
| 41 | Nil | 0.5 parts TX102$^{(1)}$ | 88° C. | 90° C. | 97.3 | |
| 42 | Nil | 0.5 parts TFX128$^{(2)}$ | 82° C. | 70° C. | 92.6 | (2) Texofor FX128 - a polyethoxylated alkyl phenol |
| 43 | Nil | 0.5 parts TFX128$^{(2)}$ | 82° C. | 90° C. | 98.3 | |
| 44 | 0.5 parts | 0.5 parts TFX128$^{(2)}$ | 82° C. | 70° C. | 96.8 | |
| 45 | 0.5 parts | 0.5 parts TFX128$^{(2)}$ | 82° C. | 90° C. | 100 | |

EXAMPLE 46

20 parts of C.I. Pigment Green 7 as filtercake was redispersed with stirring in 400 parts water. 0.2 parts hydroxy ethyl cellulose was added. The mixture was heated with stirring over 30 mins. to 80° C. and 0.5 parts of a C$_{18}$ alkyl amine as its acetate added. 18 parts dicyclohexyl phthalate were added and stirred at 80° C. for 17 mins. when the aqueous phase was substantially free of pigment. The resultant product was isolated as in example 1 and dried to give 38 parts of green beads which gave an evenly coloured product in p.v.c.

EXAMPLE 47

10 parts C.I. Pigment Red 48.2 as slurry direct from coupling was heated with stirring to 85° C. with 0.25 parts hydroxy ethyl cellulose and 0.5 parts of a C$_{18}$ alkyl amine as acetate. 10 parts dicyclohexyl phthalate was added and stirred until the aqueous phase became substantially clear of pigment. The resultant red beads were isolated and dried as in example 1 and gave an evenly coloured product in p.v.c.

What we claim is:

1. A process for the production of a pigment composition in bead form which comprises contacting with agitation, in the presence of from 0.2% to 5% by weight based on the amount of pigment plus carrier of an aqueous protective colloid, 1 part of a water insoluble carrier selected from the group consisting of fatty alcohols, fatty esters, amides of monocarboxylic fatty acids, phthalate esters, fatty oxazolines, water insoluble carboxylic acids, alkylimides, alkyl hydantoins, or mixtures of the aforementioned carriers and rosin acids or modified rosin acids, and water insoluble metal salts of said acids or a mixture of said acids with fatty primary amines, fatty secondary amines, or fatty imidazolines, said carrier melting below 100° C. and an aqueous dispersion of 0.25–2.3 parts of a pigment or water insoluble dyestuff, said process being conducted at a temperature above the melting point of the carrier and allowing the aqueous phase to become substantially free of pigment or water insoluble dyestuff by its association with the carrier and recovering the resulting pigmented beads, said pigmented beads having a particle size from 0.5 to 5 mm. diameter.

2. A process as claimed in claim 1, in which the carrier is a single compound having a melting point in the range of 40° to 100° C. or a mixture of compounds which give a mixed melting point in the range of 40° to 100° C.

3. A process as claimed in claim 1, in which the carrier is a fatty alcohol, a fatty ester, an amide of a monocarboxylic fatty acid, a fatty ester of a polyol, a benzoic acid ester of a polyol, a phthalate ester, a fatty oxazoline, a water insoluble carboxylic acid, an alkalimide, or an alkyl hydantoin.

4. A process as claimed in claim 1, in which the carrier is a mixture rosin acid, modified rosin acid, or a water insoluble metal salt thereof, together with a compound as listed in claim 3, a fatty primary or secondary amine or a fatty imidazoline.

5. A process as claimed in claim 1, in which the protective colloid is hydroxy ethyl cellulose.

6. A process as claimed in claim 1, in which the pigment dispersion is one obtained directly from an aqueous preparation, a redispersed aqueous pigment presscake or a redispersed pigment powder.

7. A process as claimed in claim 1, in which the ratio of pigment to carrier is from 1:1 to 1.5:1.

8. A process as claimed in claim 1, in which the protective colloid, powdered carrier and pigment are mixed at ambient temperature, and the mixture is then agitated at a temperature above the melting point of the carrier.

9. A process as claimed in claim 1, in which a mixture of the protective colloid and carrier is agitated above the melting point of the carrier, and the pigment dispersion is added to the hot dispersion with agitation.

10. A process as claimed in claim 1, in which an aqueous mixture of the protective colloid and pigment is heated to a temperature above the melting point of the carrier, and the carrier as a powder is added to this mixture with agitation.

11. A process as claimed in claim 1, in which an aid which faciliates the subsequent association of the pigment with the organic phase and is selected from the group consisting of a fatty amine or fatty acid which are rendered water insoluble by pH control or salt formation in amounts of up to 10% by weight of pigment is added to the mixture.

12. A process as claimed in claim 11, in which the amount of aid is up to 5% w/w on pigment.

13. A process as claimed in claim 11, in which the aid is a fatty amine or fatty acid rendered water insoluble by pH control or salt formation.

14. A process as claimed in claim 11, in which the aid is formed in the presence of an aqueous pigment dispersion.

* * * * *